United States Patent
Kawata et al.

(10) Patent No.: US 8,977,058 B2
(45) Date of Patent: Mar. 10, 2015

(54) IMAGE PROCESSING APPARATUS AND METHOD

(75) Inventors: Satoshi Kawata, Kawasaki (JP);
Takuma Yamamoto, Yokohama (JP);
Yasunori Taguchi, Kawasaki (JP);
Nobuyuki Matsumoto, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 13/569,551

(22) Filed: Aug. 8, 2012

(65) Prior Publication Data

US 2013/0044956 A1    Feb. 21, 2013

(30) Foreign Application Priority Data

Aug. 15, 2011 (JP) .................................. 2011-177525

(51) Int. Cl.
| | | |
|---|---|---|
| *G06K 9/66* | (2006.01) | |
| *G06T 5/00* | (2006.01) | |
| *H04N 1/409* | (2006.01) | |
| *G06T 5/20* | (2006.01) | |

(52) U.S. Cl.
CPC . *G06T 5/002* (2013.01); *G06K 9/66* (2013.01); *H04N 1/409* (2013.01); *G06T 5/20* (2013.01)
USPC ........... 382/192; 382/103; 382/190; 382/194; 382/198; 382/148; 382/208; 382/370; 382/441

(58) Field of Classification Search
USPC .......... 382/103, 190, 192, 194, 198; 348/148, 348/208, 370, 441
See application file for complete search history.

(56) References Cited

U.S. PATENT DOCUMENTS

| | | | | |
|---|---|---|---|---|
| 5,937,767 | A  * | 8/1999 | Togawa et al. | 108/57.26 |
| 6,804,683 | B1 * | 10/2004 | Matsuzaki et al. | 1/1 |
| 6,961,466 | B2 * | 11/2005 | Imagawa et al. | 382/190 |
| 6,970,506 | B2 * | 11/2005 | Kim et al. | 375/240.01 |
| 7,567,727 | B2 * | 7/2009 | Kondo et al. | 382/274 |
| 7,710,461 | B2 * | 5/2010 | Nagano et al. | 348/208.99 |
| 7,840,094 | B2 * | 11/2010 | Haga et al. | 382/298 |
| 8,121,414 | B2 * | 2/2012 | Yoshino | 382/194 |
| 2005/0089091 | A1 * | 4/2005 | Kim et al. | 375/240.01 |
| 2005/0259738 | A1 * | 11/2005 | Horishi et al. | 375/240.16 |
| 2006/0093184 | A1 * | 5/2006 | Fukui et al. | 382/103 |
| 2007/0120848 | A1 * | 5/2007 | Kondo et al. | 345/419 |

(Continued)

OTHER PUBLICATIONS

Buades et al.; "A Non-Local Algorithm for Image Denoising", CVPR2005, IEEE, Computer Society Conference, vol. 2, pp. 60-65, (2008).

(Continued)

*Primary Examiner* — Vu Le
*Assistant Examiner* — Aklilu Woldemariam
(74) *Attorney, Agent, or Firm* — Finnegan, Henderson, Farabow & Garrett & Dunner, LLP (57) ABSTRACT

According to one embodiment, an image processing apparatus includes following units. The correlation calculation unit calculates correlations between a first region and predetermined first basis vectors. The distance calculation unit calculates distances between the first region and second regions on a subspace generated by the second basis vectors selected from the first basis vectors. The feature quantity calculation unit calculates a feature quantity based on the correlations. The weight calculation unit calculates weights based on the distances and the feature quantity. The pixel value calculation unit calculates a weighted average of pixel values according to the weights to generate an output pixel value.

19 Claims, 5 Drawing Sheets

(56) References Cited

U.S. PATENT DOCUMENTS

| | | | |
|---|---|---|---|
| 2008/0152225 A1* | 6/2008 | Iwamoto | 382/190 |
| 2009/0040367 A1* | 2/2009 | Zakrzewski et al. | 348/370 |
| 2009/0207259 A1* | 8/2009 | Ito et al. | 348/208.4 |
| 2009/0245575 A1* | 10/2009 | Hu | 382/103 |
| 2009/0322878 A1* | 12/2009 | Ishii | 348/148 |
| 2010/0054340 A1* | 3/2010 | Reibman | 375/240.25 |
| 2010/0225790 A1* | 9/2010 | Sasaki | 348/241 |

OTHER PUBLICATIONS

Kawata et al.; "Image Denoising Via Non-Local Means With Principal Component Analysis of Color Natural Images", SSII2010, pp. IS2-06-1-IS2-06-6, (2010).

Tasdizen; "Principal Components for Non-Local Means Image Denoising", ICIP2008, 15$^{th}$ IEEE International Conference, pp. 1728-1731, (2008).

* cited by examiner

IMAGE PROCESSING APPARATUS AND METHOD

CROSS-REFERENCE TO RELATED APPLICATIONS

This application is based upon and claims the benefit of priority from prior Japanese Patent Application No. 2011-177525, filed Aug. 15, 2011, the entire contents of which are incorporated herein by reference.

FIELD

Embodiments described herein relate generally to an image processing apparatus and method for reducing noise in an image.

BACKGROUND

As an image processing technique for reducing random noise generated in an image acquired by an image capturing apparatus such as a digital camera, for example, an algorithm called Non-local Means is known. An image processing apparatus using this algorithm outputs, as a new pixel value of a target pixel, an average pixel value obtained by performing a weighted-average on pixel values of neighbor pixels of the target pixel.

Weights used in the weighted-averaging processing are controlled by a parameter. This parameter will be referred to as a smoothing strength hereinafter. When a high smoothing strength is set to effectively reduce noise, a blur is generated in a texture (or pattern) part in an image, thus consequently losing sharpness of the image. Conversely, when a low smoothing strength is set to maintain the sharpness of an image, noise cannot be sufficiently reduced, and unevenness is generated in a flat part in the image. Conventionally, the smoothing strength assumes a fixed value for one image. That is, the same smoothing strength is used for respective pixels in an image. For this reason, both noise removal and maintenance of sharpness cannot be achieved at the same time.

Therefore, an image processing apparatus which can sufficiently remove noise while maintaining sharpness of an image is demanded.

DETAILED DESCRIPTION

In general, according to one embodiment, an image processing apparatus includes a correlation calculation unit, a selection unit, a distance calculation unit, a feature quantity calculation unit, a weight calculation unit, and a pixel value calculation unit. The correlation calculation unit is configured to calculate first correlations between a first region and a plurality of predetermined first basis vectors, the first region including a first pixel in an image. The selection unit is configured to select one or more second basis vectors from the first basis vectors in accordance with magnitudes of the first correlations. The distance calculation unit is configured to calculate distances between the first region and a plurality of second regions on a subspace generated by the second basis vectors, the second regions including second pixels in the image, respectively. The feature quantity calculation unit is configured to calculate a feature quantity indicating a feature of the first region based on one or more second correlations corresponding to one or more predetermined third basis vectors among the first correlations, the third basis vectors being selected from the first basis vectors. The weight calculation unit is configured to calculate weights to be respectively assigned to the second pixels based on the distances and the feature quantity. The pixel value calculation unit is configured to calculate a weighted average of pixel values of the second pixels according to the weights to generate an output pixel value.

The embodiment provides an image processing apparatus and method, which can remove noise in an image while maintaining sharpness of the image.

Image processing apparatuses and methods according to embodiments will be described hereinafter with reference to the drawings. In the embodiments, like reference numbers denote like elements, and duplication of explanation will be avoided.

First Embodiment

Figure 1:
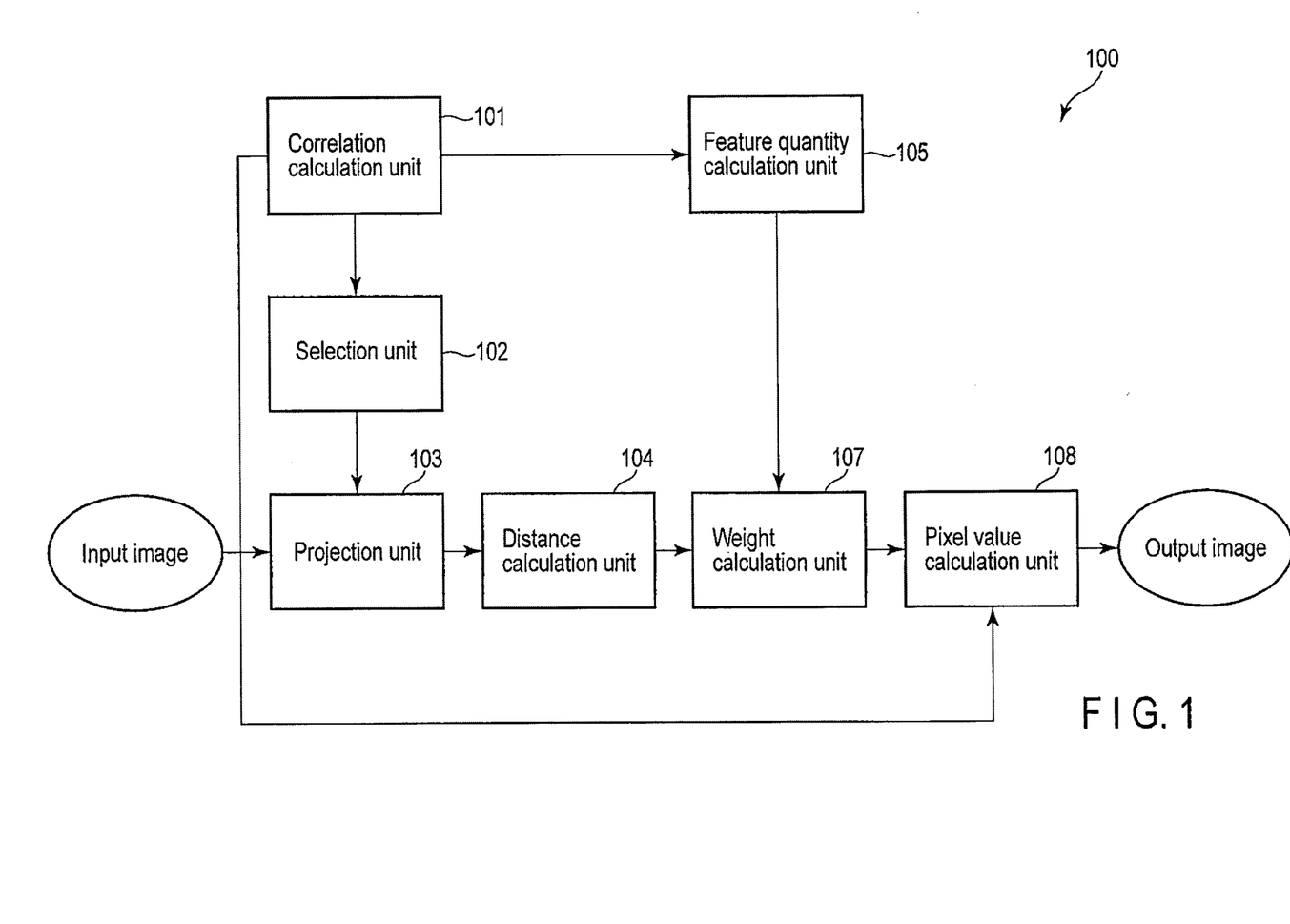
FIG. 1 is a block diagram schematically showing an image processing apparatus according to the first embodiment.

FIG. 1 schematically shows an image processing apparatus 100 according to a first embodiment. As shown in FIG. 1, this image processing apparatus 100 includes a correlation calculation unit 101, selection unit 102, projection unit 103, distance calculation unit 104, feature quantity calculation unit 105, weight calculation unit 107, and pixel value calculation unit 108.

In the image processing apparatus 100, an image to be processed (hereinafter, referred to as an input image) is supplied to the correlation calculation unit 101, projection unit 103, and pixel value calculation unit 108. This input image is, for example, a color image, and each pixel which forms the input image has red, green, and blue pixel values. In the following description of this embodiment, assume that each pixel has a single pixel value for the sake of simplicity. Note that the input image is not limited to the above example, that is, the color image, but it may be a monochrome image. When the input image is a monochrome image, each pixel in the input image has a luminance value as a pixel value.

The correlation calculation unit 101 calculates correlations between a first region, which includes a pixel (hereinafter, referred to as a first pixel) selected as a target pixel from a plurality of pixels included in the input image, and a plurality of basis vectors, which are predetermined or prepared in advance. These basis vectors are stored in advance in, for example, an internal memory (not shown) of the correlation calculation unit 101. Alternatively, the basis vectors may be stored in advance in a storage unit (not shown) so as to allow the correlation calculation unit 101 and the like to refer to them as needed.

The selection unit 102 selects one or more basis vectors from the plurality of basis vectors, which are prepared in advance, in accordance with the magnitudes of the correlations calculated by the correlation calculation unit 101.

The projection unit 103 projects the first region and a plurality of second regions onto a subspace generated by the basis vectors selected by the selection unit 102. The second regions include second pixels in the input image, respectively.

The distance calculation unit 104 calculates distances between the first region and the second regions on the subspace.

The feature quantity calculation unit 105 calculates a feature quantity for controlling a smoothing strength (to be described later), using the correlations corresponding to one or more basis vectors selected from the plurality of basis vectors prepared in advance.

The weight calculation unit 107 calculates weights to be respectively assigned to the second pixels, based on the distances calculated by the distance calculation unit 104 and the feature quantity calculated by the feature quantity calculation unit 105.

The pixel value calculation unit 108 calculates weighted average of pixel values of the second pixels according to the weights calculated by the weight calculation unit 107, thereby generating a new pixel value to be assigned to the first pixel.

An example of a method of generating the basis vectors (also referred to as first basis vectors) which are prepared in advance will be described below.

Various color images on which no noise is superposed are prepared, and partial images each having a predetermined size are extracted from these images. Vectors obtained by arranging pixel values included in the partial images are generated as sample vectors. Then, the sample vectors generated from the respective partial images undergo principal component analysis to generate basis vectors. For example, when a partial image is a rectangular (or square) block defined by seven pixels in the vertical direction and seven pixels in the horizontal direction, and each pixel has pixel values of three colors (red, green, and blue), 147 (=7×7×3) basis vectors are generated. In this case, each basis vector includes 147 elements.

The basis vectors generated in this way include those which have high correlations with a texture (or pattern) part, those which have high correlations with an edge part, those which have high correlations with a flat part, those which have high correlations with noise, and the like.

The image processing apparatus 100 of the present embodiment uses some of basis vectors generated as results of the principal component analysis as first basis vectors. More specifically, in the present embodiment, from the basis vectors generated as the results of the principal component analysis, those which have eigenvalues smaller than a predetermined value are excluded. Basis vectors having large eigenvalues express local structures included in general images. By contrast, basis vectors having small eigenvalues do not so contribute to expressions of local structures of images, and are likely to have high correlations with noise superposed on an input image. Therefore, by calculating distances between regions on a subspace generated based on basis vectors obtained by excluding those having small eigenvalues, those between the regions can be calculated while eliminating the influence of noise.

In terms of improvement of image quality of an output image, it is desirable that the basis vectors used in the image processing apparatus 100 do not include those having small eigenvalues. However, the basis vectors used in the image processing apparatus 100 may include those having small eigenvalues. Furthermore, the image processing apparatus 100 may use all the basis vectors generated as the results of the principal component analysis.

Note that the method of generating the basis vectors is not limited to that based on the principal component analysis, but may be a method based on canonical analysis or independent component analysis. Furthermore, the basis vectors may use basis of two-dimensional discrete Fourier transformation, those of two-dimensional discrete wavelet transformation, those of two-dimensional discrete cosine transformation, or the like.

The operation of the image processing apparatus 100 will be described below with reference to FIG. 2.

Figure 2:
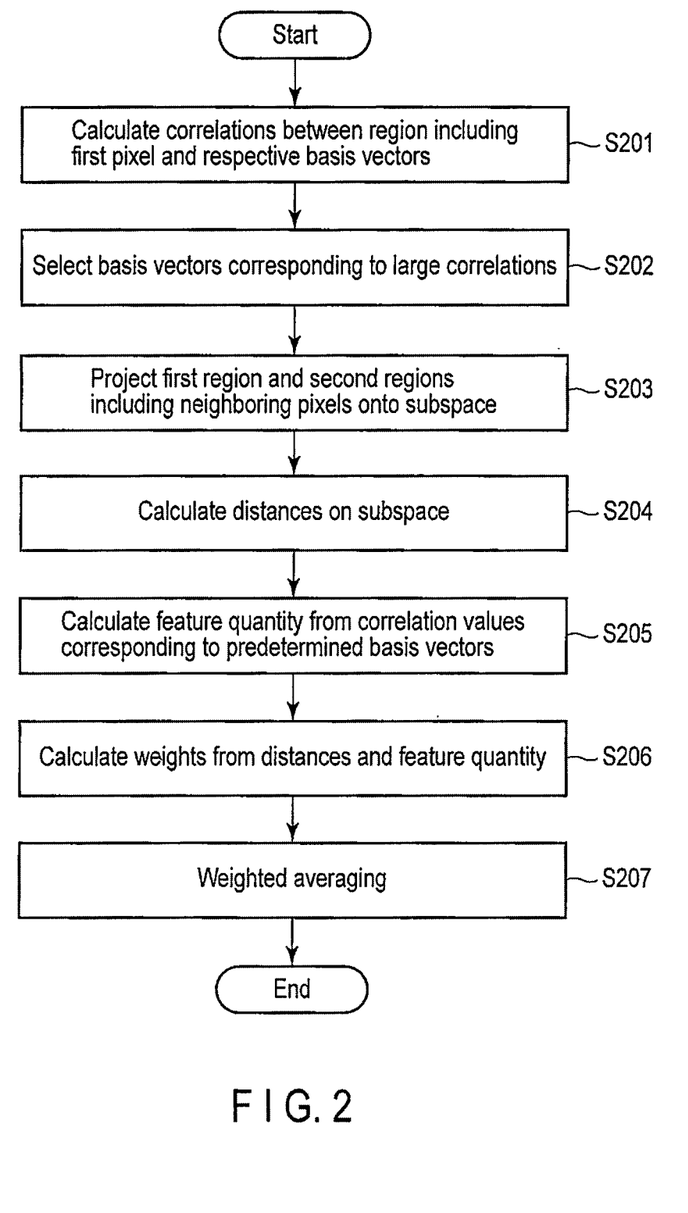
FIG. 2 is a flowchart showing an example of the operation of the image processing apparatus shown in FIG. 1.

FIG. 2 schematically shows an example of the operation of the image processing apparatus 100. More specifically, FIG. 2 shows the sequence of image processing to be applied to one pixel in the input image. In the present embodiment, pixels which form the input image are selected pixel by pixel in a predetermined order (for example, a raster scan order). The selected pixel (that is, the first pixel) is processed according to the sequence to be described below.

Figure 3:
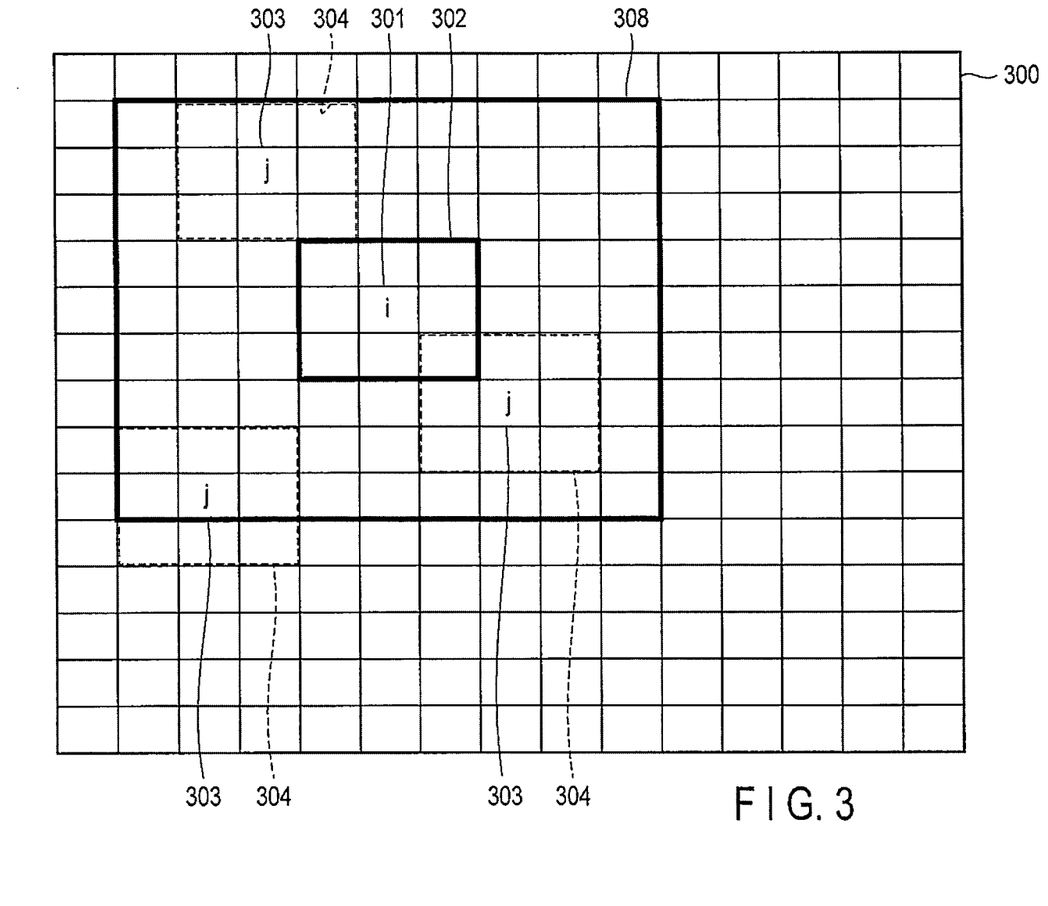
FIG. 3 is a schematic view showing an image to be processed by the image processing apparatus shown in FIG. 1.

In step S201, the correlation calculation unit 101 calculates correlations between the first region including the first pixel and a plurality of (for example, N) basis vectors, which are prepared in advance. In the present embodiment, the first region is a local region 302 on an input image 300 having a first pixel 301 as the center, as shown in FIG. 3. In FIG. 3, one small block represents one pixel. In the example of FIG. 3, the first region 302 is a rectangular block defined by three pixels in the vertical direction and three pixels in the horizontal direction. Note that the size and shape of the first region 302 are not limited to the example shown in FIG. 3, and they may be arbitrarily set. Also, the first pixel 301 need not be located at the center of the first region 302.

When the first pixel 301 is a pixel located at an end portion (for example, at an upper left corner) of the input image 300, the first region 302 includes a region outside the input image 300. Since no pixels are disposed on the region outside the input image 300, the first region 302 does not have any pixel values at pixel positions corresponding to the region outside the input image 300. In one example, to these pixel positions having no pixel values, pixel values at the end portion of the input image 300 are copied. Note that the first pixel 301 may be selected by excluding the end portion of the input image 300, so that the first region 302 falls within the input image 300.

A practical method of calculating correlations between the first region and basis vectors in step S201 will be described. For example, the correlation calculation unit 101 calculates inner products between a vector (referred to as a first vector) generated by arranging pixel values in the first region and the N basis vectors, and acquires absolute values or square values of the calculated inner products as the correlations. Assume that the first pixel is an $i^{th}$ pixel in the input image, and let $v_i$ be the first vector. Also, let $(v_i)_k$ be a $k^{th}$ element of the first vector $v_i$. Furthermore, let $a_n$ be an $n^{th}$ basis vector of the N basis vectors, and $(a_n)_k$ be a $k^{th}$ element of the basis vector $a_n$. When a correction $p_n$ between the first region and the basis vector is calculated as an absolute value of an inner product between the first vector $v_i$ and basis vector $a_n$, the correction $p_n$ is calculated by:

$$p_n = \left| \sum_k \{(v_i)_k \times (a_n)_k\} \right| \quad (1)$$

In the example of the above description, correlations with the first region are calculated in association with all the N basis vectors. However, one or more basis vectors of these basis vectors may be excluded from correlation calculation targets. For example, the correlation calculation unit 101 may not calculate a correlation between the first vector and the basis vector in which an absolute value of a sum total of elements is maximum.

A correlation between the first region and a basis vector in which the absolute value of a sum total of elements is large generally is a value larger than that of a correction between the first region and a basis vector in which the absolute value of a sum total of elements is small. This becomes conspicuous especially when the first region is a bright region (that is, a region having a large average pixel value). For this reason, with respect to the bright region, only a small number of basis vectors having relatively large absolute values of sum totals of elements tend to be selected in next step S202. That is, for the bright region, whether this region is a texture part or flat part cannot be discriminated. When only specific basis vectors are selected in this manner, unevenness is generated in a flat part or a blur is generated in a texture part in a final output image. Therefore, by calculating correlations by excluding one or more basis vectors in which the absolute values of the sum totals of elements are relatively large, basis vectors which appropriately express the local structure of the first region are selected, thus preventing generation of unevenness and a blur in a final output image.

Furthermore, this embodiment is not limited to the example of calculating the correlations between the first region and the basis vectors based on the inner products of the first vector and basis vectors, but the correlations may be calculated by any other methods.

In step S202, the selection unit 102 selects one or more basis vectors (also referred to as second basis vectors) from those which are prepared in advance, in accordance with the correlations calculated in step S201. More specifically, the selection unit 102 selects one or more basis vectors in descending order of correction until a total of the correlations of the basis vectors reaches a threshold. A threshold $P_T$ is set to be a value 70% of the sum total of the correlations $p_n$ calculated in step S201, as given by:

$$P_T = 0.7 \times \sum_{n=1}^{N} p_n \qquad (2)$$

In this step S202, the basis vectors having larger correlations with the first region are selected. Then, in the subsequent processes, since distances between the first region and second regions are calculated on the subspace which reflects the local structure of the first region, the second regions having structures similar to that of the first region can be accurately searched for.

Let d be the number of basis vectors selected in step S202. Also, the basis vectors selected by the selection unit 102 are described as vectors $b_n$ (n=1, . . . , d). For example, when the selection unit 102 selects three basis vectors $a_1$, $a_3$, and $a_8$, they are respectively described as vectors $b_1$, $b_2$, and $b_3$ in the following equations. Note that when the correlations are calculated by excluding a specific basis vector, the basis vectors selected by the selection unit 102 include the excluded basis vector. For example, when a basis vector $a_1$ is excluded, and basis vectors $a_2$, $a_3$, and $a_6$ are selected, the selection unit 102 outputs the basis vectors $a_1$, $a_2$, $a_3$, and $a_6$ as basis vectors $b_1$, $b_2$, $b_3$, and $b_4$.

In step S203, the projection unit 103 projects the first region and a plurality of second regions onto a subspace generated by the basis vectors $b_n$ selected by the selection unit 102, thereby generating a first projection vector and a plurality of second projection vectors. In the present embodiment, as shown in FIG. 3, each second region is a rectangular block 304 which has a second pixel 303 as the center and is defined by three pixels in the vertical direction and three pixels in the horizontal direction. Typically, the second region 304 is set to have the same size and shape as those of the first region 302. The second pixel 303 is that included in a predetermined search range 308. In this case, assume that the second pixel 303 is a $j^{th}$ pixel in the input image 300. In FIG. 3, the search range 308 is a rectangular block which has the first pixel 301 as the center and is defined by nine pixels in the vertical direction and nine pixels in the horizontal direction. In this case, the number of second pixels (that is, the number of second regions) is 81 (=9×9). Note that the size and shape of the search range 308 can be arbitrarily set. Furthermore, the search range 308 need not include the first pixel 301.

More specifically, the projection unit 103 generates a first projection vector $v_i'$ by applying vector transformation to a first vector $v_i$ generated from the first region according to:

$$v_i' = \sum_{n=1}^{d} f_{i,n} b_n \qquad (3)$$

where $f_{i,n}$ is an inner product between the first vector $v_i$ and basis vector $b_n$.

Furthermore, the projection unit 103 generates a second vector $v_j$ by arranging pixel values in each second region as elements. Then, the projection unit 103 generates a second projection vector $v_j'$ by applying vector transformation to the second vector $v_j$ according to:

$$v_j' = \sum_{n=1}^{d} f_{j,n} b_n \qquad (4)$$

In step S204, the distance calculation unit 104 calculates distances between the first region and second regions on a subspace generated by the basis vectors $b_n$. More specifically, the distance calculation unit 104 calculates a distance D(i, j) between the first projection vector $v_i'$ and the second, projection vector $v_j'$ generated in step S203 according to:

$$D(i, j) = \sum_{n=1}^{d} \{(v_i')_n - (v_j')_n\}^2 \qquad (5)$$

The distance D(i, j) is calculated respectively for the plurality of second regions.

Note that the distance is not limited to the example of a difference square sum given by equation (5), but it may be calculated as a difference absolute value sum or the like.

In step S205, the feature quantity calculation unit 105 calculates a feature quantity for controlling a smoothing strength, based on correlations corresponding to one or more predetermined basis vectors (referred to as third basis vectors) of the plurality of basis vectors prepared in advance. More specifically, the feature quantity calculation unit 105 receives the correlations between the predetermined basis vectors and first region from the correlation calculation unit 101. Then, the feature quantity calculation unit 105 calculates a total of the correlations received from the correlation calculation unit 101, and acquires this total value as a feature quantity T(i). As the predetermined basis vectors, those which have high correlations with a texture part are selected from the N basis vectors prepared in advance. Thus, if the first pixel i belongs to a texture part, the feature quantity T(i) is a large value; if the first pixel i belongs to a flat part, the feature quantity T(i) is a small value.

Note that the feature quantity is not limited to the total of the correlations corresponding to the predetermined basis vectors. For example, the feature quantity may be a value based on a ratio of the total of the correlations corresponding to the predetermined basis vectors to that of the correlations corresponding to all the N basis vectors prepared in advance.

In step S206, the weight calculation unit 107 calculates weights W(j) to be assigned to the second pixels j, based on the distances D(i, j) calculated in step S204 and the feature quantity T(i) calculated in step S205. The weight W(j) monotonically decreases with respect to the distance D(i, j) and feature quantity T. That is, the weight W(j) is a smaller value with increasing distance D(i, j) and with increasing feature quantity T(i). For example, the weight W(j) is calculated according to:

$$W(j) = \exp\left(-\frac{D(i,j) \times T(i)}{h^2}\right) \quad (6)$$

where h is a parameter used to designate a smoothing degree in the entire input image. In the present embodiment, a square value $h^2$ of this parameter will be referred to as a smoothing strength. When a smoothing strength $h^2$ is set to a high value, the weights W(j) assigned to all pixels j are relatively large values, that is, the pixels j are strongly smoothed. As a result, noise in the input image is greatly reduced.

In the present embodiment, the smoothing strength is controlled using the feature quantity T(i) for each first pixel i. That is, in equation (6), a factor $h^2/T(i)$ can be considered as a smoothing strength to be applied to the first pixel i. According to this viewpoint, if the first pixel i belongs to a texture part, since the feature quantity T(i) is a large value, it is controlled to set a low smoothing strength for the texture part. On the other hand, if the first pixel i belongs to a flat part, since the feature quantity T(i) is a small value, it is controlled to set a high smoothing strength for the flat part. Therefore, the smoothing strength to be applied to the first pixel i is controlled in accordance with the feature (local structure) of a region to which the first pixel belongs.

In step S207, the pixel value calculation unit 108 performs a weighted-average on pixel values of the second pixels within the search range according to the weights W(j) calculated in step S206. For example, the pixel value calculation unit 108 calculates a weighted average value y'(i) of pixel values y(j) of the second pixels j according to:

$$y'(i) = \frac{1}{Z(i)} \sum_{j \in \Omega(i)} (W(j) \times y(j)) \quad (7)$$

$$Z(i) = \sum_{j \in \Omega(i)} W(j)$$

where Ω(i) indicates the search range for the second pixels.

The pixel value calculation unit 108 outputs the calculated weighted average value y'(i) as a new pixel value of the first pixel i. That is, the weighted average value y'(i) is used as a pixel value of the pixel i in the output image.

As described above, if the first pixel belongs to a texture part, the feature quantity calculated for this first pixel is a large value. In this case, since weights assigned to all pixels within the search range are relatively small values, excessive smoothing is not applied. As a result, the texture part can maintain sharpness. On the other hand, if the first pixel belongs to a flat part, the feature quantity is a small value. In this case, since weights assigned to all pixels within the search range are relatively large values, strong smoothing is applied. As a result, noise can be effectively reduced for the flat part.

As described above, in the image processing apparatus according to the present embodiment, the feature quantity is calculated using the basis vectors having high correlations with the texture part, and the smoothing strength is controlled according to this feature quantity, thereby reducing noise while maintaining sharpness of an image.

Modification of First Embodiment

An image processing apparatus according to a modification of the first embodiment has the same arrangement as that of the image processing apparatus 100 of the first embodiment shown in FIG. 1. In the modification of the first embodiment, the feature quantity calculation method by the feature quantity calculation unit is different from the first embodiment.

The feature quantity calculation unit according to the modification of the first embodiment calculates a feature quantity based on a total of correlations corresponding to predetermined basis vectors (third basis vectors) of the first basis vectors and that of correlations corresponding to basis vectors (to be referred to as fourth basis vectors hereinafter) different from the third basis vectors of the first basis vectors. For example, letting $p_a$ to $p_b$ be the correlations corresponding to the third basis vectors, and $p_c$ to $p_d$ be those corresponding to the fourth basis vectors, the feature quantity is calculated by one of:

$$T = \frac{\sum_{i=a}^{b} p_i}{\sum_{j=c}^{d} p_j} \quad (8)$$

$$T = \exp\left(\frac{\sum_{i=a}^{b} p_i}{\sum_{j=c}^{d} p_j}\right) \quad (9)$$

$$T = \frac{\exp\left(\sum_{i=a}^{b} p_i\right)}{\exp\left(\sum_{j=c}^{d} p_j\right)} \quad (10)$$

As described above, the third basis vectors are those which have high correlations with a texture art of the first basis vectors. As the fourth basis vectors, for example, those which have high correlations with a flat part of the first basis vectors are used. Using the basis vectors having high correlations with the texture part as the third basis vectors, and those having high correlations with the flat part as the fourth basis vectors, the following control can be attained. That is, the texture part, sharpness of which is to be maintained, can be prevented from being excessively smoothed, and the flat part can be strongly smoothed.

Alternatively, the feature quantity calculation unit 105 may calculate the feature quantity based on a total of correlations corresponding to the first basis vectors, that of correlations corresponding to the third basis vectors, and that of correlations corresponding to the fourth basis vectors, as given by:

$$T = \frac{\exp\left(\frac{\sum_{i=a}^{b} p_i}{\sum_{k=1}^{N} p_k}\right)}{\exp\left(\frac{\sum_{j=c}^{d} p_j}{\sum_{k=1}^{N} p_k}\right)} \quad (11)$$

Second Embodiment

Figure 4:
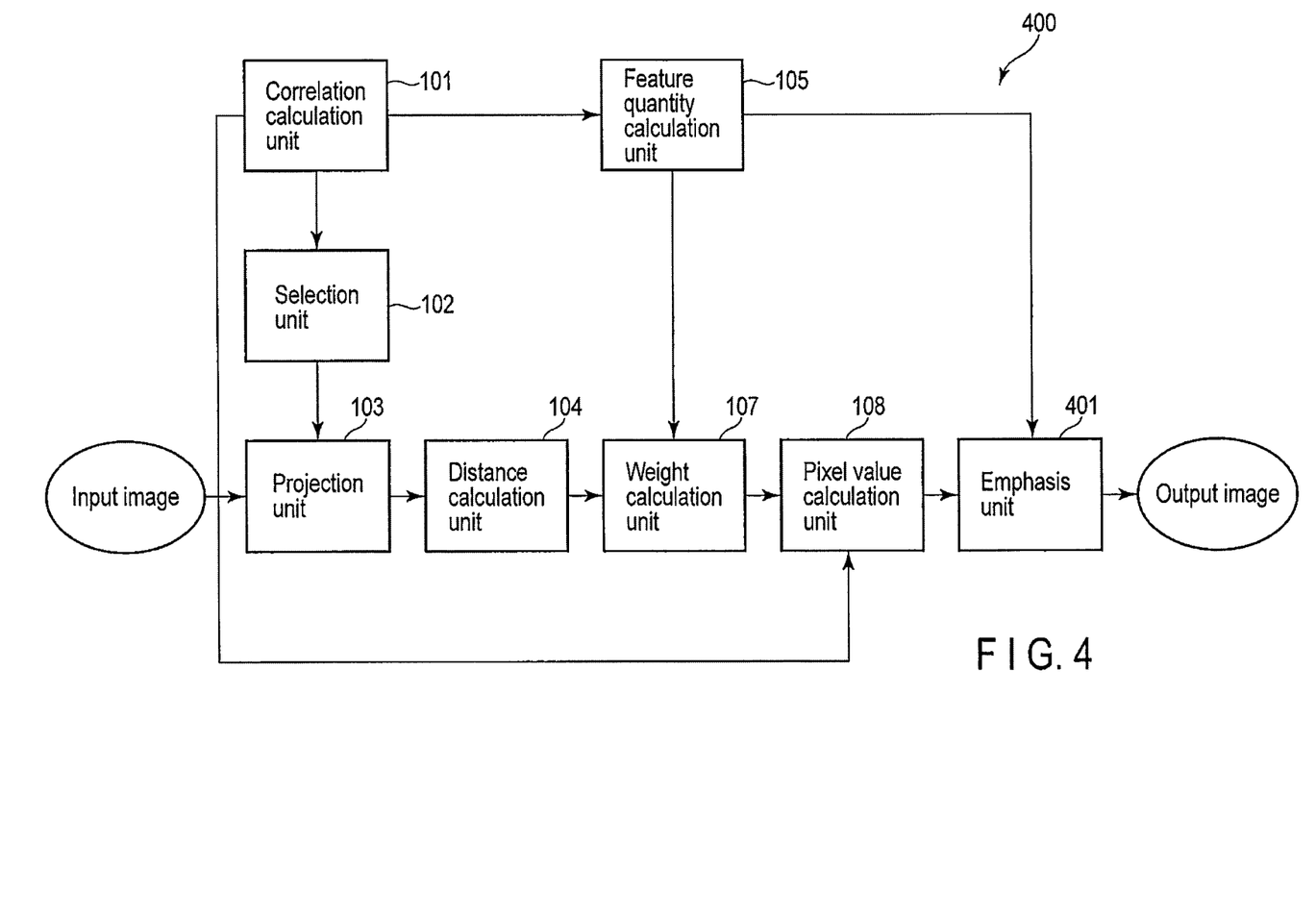
FIG. 4 is a block diagram schematically showing an image processing apparatus according to the second embodiment.

FIG. 4 schematically shows an image processing apparatus 400 according to a second embodiment. The image processing apparatus 400 shown in FIG. 4 includes an emphasis unit 401 in addition to the arrangement of the image processing apparatus 100 shown in FIG. 1. The emphasis unit 401 emphasizes a pixel value calculated by the pixel value calculation unit 108 according to the feature quantity calculated by the feature quantity calculation unit 105.

Figure 5:
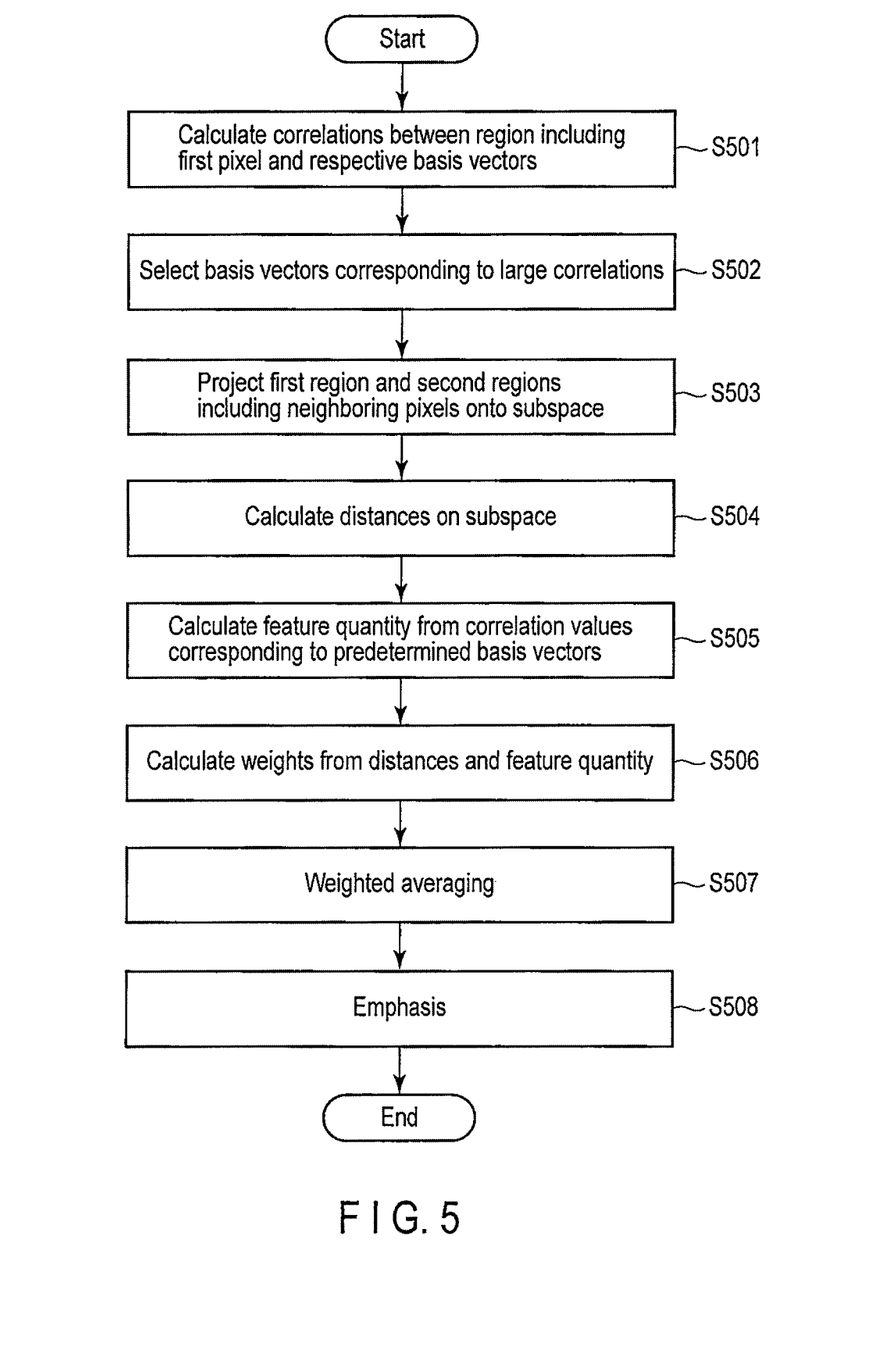
FIG. 5 is a flowchart showing an example of the operation of the image processing apparatus shown in FIG. 4.

FIG. 5 shows an example of the operation of the image processing apparatus 400. Since steps S501 to S507 in FIG. 5 are the same operations as in steps S201 to S207 in FIG. 2, a description thereof will not be repeated.

In steps S501 to S507, new pixel values (output pixel values) are assigned to respective pixels of the input image. In step S508, the emphasis unit 401 emphasizes an output pixel value according to the feature quantity calculated by the feature quantity calculation unit 105. As an emphasis method, for example, sharpening processing such as unsharp mask can be used. In one example, the emphasis unit 401 applies strong sharpening processing to a pixel corresponding to a larger feature quantity. In another example, the emphasis unit 401 applies sharpening processing to a pixel corresponding to a feature quantity larger than a predetermined value (that is, a pixel of a texture part). In still another example, the emphasis unit 401 applies sharpening processing stronger to a pixel corresponding to a feature quantity larger than the predetermined value as the feature quantity is larger. The emphasis of the output pixel value may be achieved by applying sharpening processing to the first region.

Furthermore, the emphasis unit 401 may apply emphasis by multiplying components corresponding to one or more predetermined basis vectors of the first basis vectors by a constant in vectors (first and second projection vectors) expressed on a subspace. For example, when components corresponding to a $g^{th}$ basis vector are to be emphasized, a coefficient $f_{i,g}$ in equation (3) is multiplied by c (c is a real number).

As described above, the image processing apparatus according to the second embodiment includes the emphasis unit which emphasizes pixel values calculated by the pixel value calculation unit 108, thus sharpening a final output image more.

According to at least one of the aforementioned embodiments, the feature quantity is calculated using basis vectors (third basis vectors) having high correlations with a texture part, and the smoothing strength is controlled according to this feature quantity, thereby reducing noise while maintaining sharpness of an image.

Note that each of the aforementioned image processing apparatuses may be implemented using, for example, a general-purpose computer as basic hardware. That is, the correlation calculation unit 101, selection unit 102, projection unit 103, distance calculation unit 104, feature quantity calculation unit 105, weight calculation unit 107, pixel value calculation unit 108, and emphasis unit 401 can be implemented when a processor included in the computer is controlled to execute a program. At this time, the image processing apparatus may be implemented by installing the program in the computer in advance, or may be implemented by distributing the program via a network or a recording medium such as a CD-ROM, and installing this program in the computer as needed. Also, the internal memory which stores the basis vectors prepared in advance can be implemented using a memory or hard disk, which is incorporated in or externally connected to the computer, or a storage medium such as a CD-R, CD-RW, DVD-RAM, or DVD-R as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising a processor configured to:
    calculate first correlations between a first region and a plurality of predetermined first basis vectors, the first region including a first pixel in an image;
    select one or more second basis vectors from the first basis vectors in accordance with magnitudes of the first correlations;
    calculate distances between the first region and a plurality of second regions on a subspace generated by the second basis vectors, the second regions including second pixels in the image, respectively;
    calculate a feature quantity indicating a feature of the first region based on one or more second correlations corresponding to one or more predetermined third basis vectors among the first correlations, the third basis vectors being selected from the first basis vectors;
    calculate weights to be respectively assigned to the second pixels based on the distances and the feature quantity; and
    calculate a weighted average of pixel values of the second pixels according to the weights to generate an output pixel value.

2. The apparatus according to claim 1, wherein the calculating the feature quantity calculates a total of absolute values of the second correlations, and calculates the feature quantity based on the total, the larger the total is, the larger the feature quantity is, and
    the weight calculation unit sets the weights to smaller values as the feature quantity is larger.

3. The apparatus according to claim 1, wherein the calculating the feature quantity calculates a square sum of the second correlations, and calculates the feature quantity based on the square sum, the larger the square sum is, the larger the feature quantity is, and the calculating the weights sets the weights to smaller values as the feature quantity is larger.

4. The apparatus according to claim 1, wherein the calculating the feature quantity calculates a ratio of a square sum of the second correlations to a square sum of the first correlations, and calculates the feature quantity based on the ratio, the larger the ratio is, the larger the feature quantity is, and the calculating the weights sets the weights to smaller values as the feature quantity is larger.

5. The apparatus according to claim 1, wherein the calculating the feature quantity calculates the feature quantity based on a total of absolute values of the correlations corresponding to the third basis vectors, and a total of absolute values of correlations corresponding to one or more predetermined fourth basis vectors, the fourth basis vectors being selected from the first basis vectors and different from the third basis vectors.

6. The apparatus according to claim 1, the processor is further configured to emphasize the output pixel value according to the feature quantity.

7. The apparatus according to claim 6, wherein the emphasizing the output pixel value applies sharpening processing to the first region.

8. The apparatus according to claim 6, wherein the emphasizing the output pixel value emphasizes one or more components corresponding to one or more predetermined fifth basis vectors on the subspace, the fifth basis vectors being selected from the first basis vectors.

9. The apparatus according to claim 1, wherein the calculating the first correlations unit generates a first vector by arranging pixel values in the first region, and calculates first correlations between the first vector and the first basis vectors.

10. An image processing method comprising:
    calculating first correlations between a first region and a plurality of predetermined first basis vectors, the first region including a first pixel in an image;
    selecting one or more second basis vectors from the first basis vectors in accordance with magnitudes of the first correlations;
    calculating distances between the first region and a plurality of second regions on a subspace generated by the second basis vectors, the second regions including second pixels in the image, respectively;
    calculating a feature quantity indicating a feature of the first region based on one or more second correlations corresponding to one or more predetermined third basis vectors among the first correlations, the third basis vectors being selected from the first basis vectors;
    calculating weights to be respectively assigned to the second pixels based on the distances and the feature quantity; and
    calculating a weighted average of pixel values of the second pixels according to the weights to generate an output pixel value.

11. The method according to claim 10, wherein the calculating the feature quantity comprises calculating a total of absolute values of the second correlations, and calculating the feature quantity based on the total, the larger the total is, the larger the feature quantity is, and the calculating the weights comprises setting the weights to smaller values as the feature quantity is larger.

12. The method according to claim 10, wherein the calculating the feature quantity comprises calculating a square sum of the second correlations, and calculating the feature quantity based on the square sum, the larger the square sum is, the larger the feature quantity is, and the calculating the weights comprises setting the weights to smaller values as the feature quantity is larger.

13. The method according to claim 10, wherein the calculating the feature quantity comprises calculating a ratio of a square sum of the second correlations to a square sum of the first correlations, and calculating the feature quantity based on the ratio, the larger the ratio is, the larger the feature quantity is, and the calculating the weights comprises setting the weights to smaller values as the feature quantity is larger.

14. The method according to claim 10, wherein the calculating the feature quantity comprises calculating the feature quantity based on a total of absolute values of the correlations corresponding to the third basis vectors, and a total of absolute values of correlations corresponding to one or more predetermined fourth basis vectors, the fourth basis vectors being selected from the first basis vectors and different from the third basis vectors.

15. The method according to claim 10, further comprising emphasizing the output pixel value according to the feature quantity.

16. The method according to claim 15, wherein the emphasizing the output pixel value comprises applying sharpening processing to the first region.

17. The method according to claim 15, wherein the emphasizing the output pixel value comprises emphasizing one or more components corresponding to one or more predetermined fifth basis vectors on the subspace, the fifth basis vectors being selected from the first basis vectors.

18. The method according to claim 10, wherein the calculating the first correlations comprises generating a first vector by arranging pixel values in the first region, and calculating first correlations between the first vector and the first basis vectors.

19. A non-transitory computer readable medium including computer executable instructions, wherein the instructions, when executed by a processor, cause the processor to perform a method comprising:
    calculating first correlations between a first region and a plurality of predetermined first basis vectors, the first region including a first pixel in an image;
    selecting one or more second basis vectors from the first basis vectors in accordance with magnitudes of the first correlations;
    calculating distances between the first region and a plurality of second regions on a subspace generated by the second basis vectors, the second regions including second pixels in the image, respectively;
    calculating a feature quantity indicating a feature of the first region based on one or more second correlations corresponding to one or more predetermined third basis vectors among the first correlations, the third basis vectors being selected from the first basis vectors;
    calculating weights to be respectively assigned to the second pixels based on the distances and the feature quantity; and
    calculating a weighted average of pixel values of the second pixels according to the weights to generate an output pixel value.

* * * * *